United States Patent [19]

Brouwer

[11] Patent Number: 4,550,626
[45] Date of Patent: Nov. 5, 1985

[54] SERVO-MOTOR ASSEMBLY FOR MACHINE SLIDES

[76] Inventor: Frans Brouwer, 410 Greenwood Ave., Glencoe, Ill. 60022

[21] Appl. No.: 475,197

[22] Filed: Mar. 14, 1983

[51] Int. Cl.⁴ .................. F16H 55/18; F16H 1/04; F16H 35/06
[52] U.S. Cl. ...................... 74/409; 74/422; 74/395; 74/396
[58] Field of Search ............ 74/409, 422, 496, 495, 74/395, 396; 104/165; 105/29 R; 266/58

[56] References Cited

U.S. PATENT DOCUMENTS

| | | | |
|---|---|---|---|
| 674,447 | 5/1901 | Mase | 74/422 |
| 951,842 | 3/1910 | Pratt | 105/29 R |
| 2,429,696 | 10/1947 | Merkt | 74/422 |
| 3,439,554 | 4/1969 | Purkhiser | 74/409 |
| 3,704,449 | 11/1972 | Hutchins | 74/409 |
| 3,773,316 | 11/1973 | Stemmle | 74/409 |
| 3,828,622 | 8/1974 | Neff | 74/409 |
| 4,133,217 | 1/1979 | Blessing | 74/395 |

Primary Examiner—Lawrence J. Staab
Assistant Examiner—Michael D. Bednarek
Attorney, Agent, or Firm—Dillis V. Allen

[57] ABSTRACT

A servo-motor assembly for a machine slide having a rack and pinion drive that includes a servo-motor support with a pinion carrying output shaft all totally supported by and cantilevered on a pair of normally flat parallel springs that bias the motor support and pinion toward the rack to eliminate backlash.

11 Claims, 8 Drawing Figures

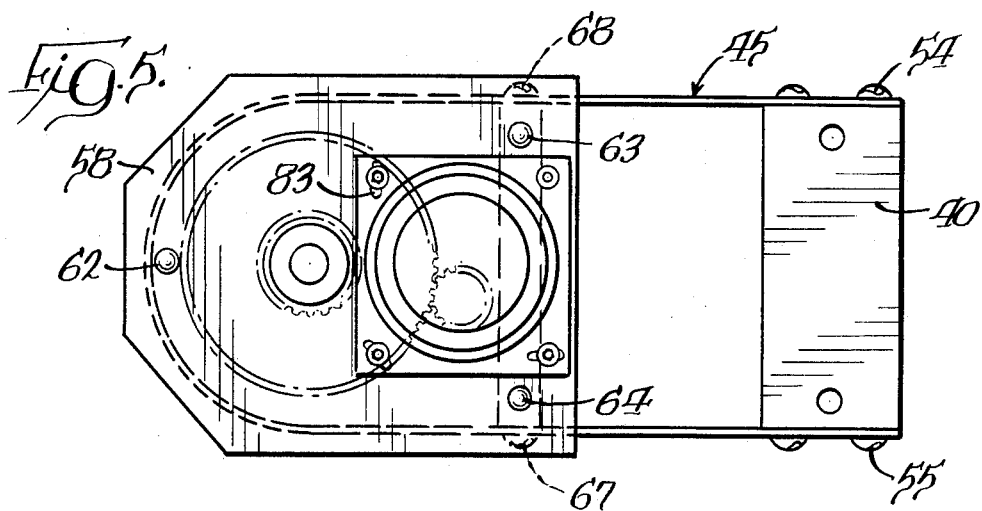
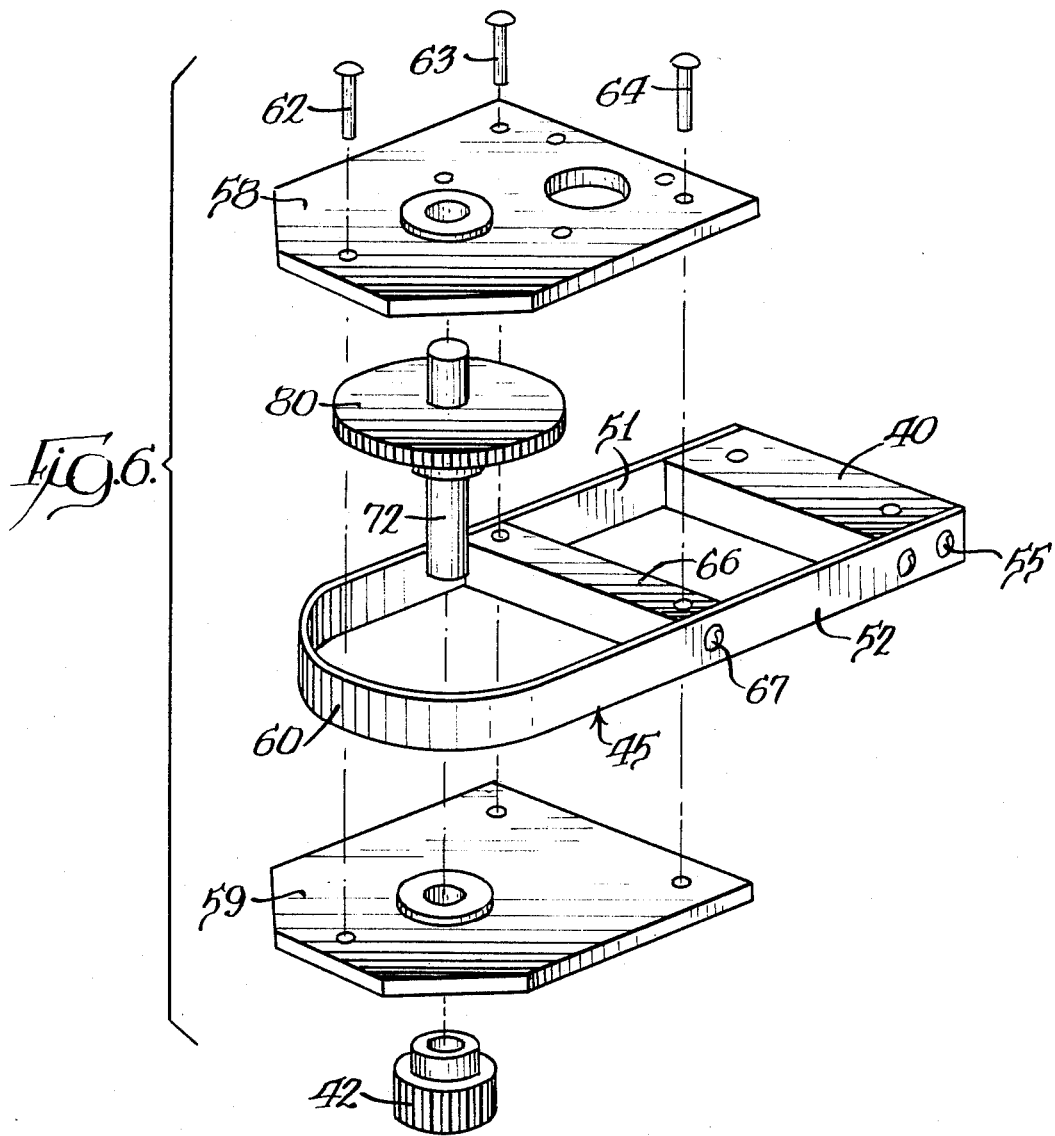

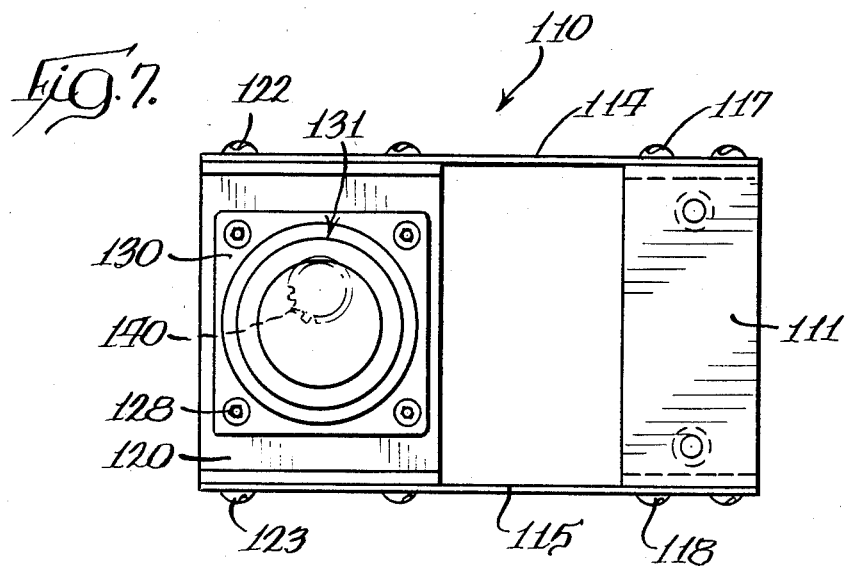
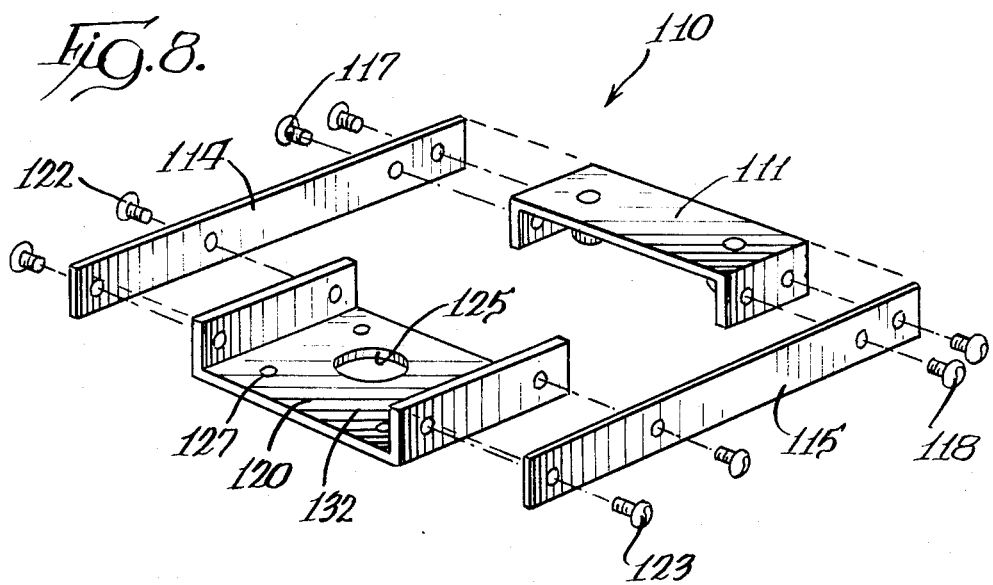

SERVO-MOTOR ASSEMBLY FOR MACHINE SLIDES

BACKGROUND OF THE INVENTION

A great many machine tools, and particularly more sophisticated machine tools, are driven by servo-motors under the control of an optical tracer, a mechanical tracer or a tape readable control. To obtain accuracy in the machining operation it is important to reduce the amount of backlash in the drive between the servo-motor and the movable machine member and keep it to an absolute minimum. Many machine tools employ a rack and pinion drive where the pinion is carried by the output shaft of a gearbox, and in such tools the greatest contribution to the total backlash is caused by the free-play between the rack and the pinion. In smaller machine tools such as flame cutting tools that do not have a high order of precision compared to metal working tools such as milling and boring machines, the machine ways or rails are frequently not in precision alignment and some means must be provided to accommodate the resulting misalignment produced between the rack and the pinion.

In order to eliminate the misalignment between the rack and pinion gears, the servo-drives are frequently cantilevered on a pivoting member, which allows the pinion to be pressed against the rack with the aid of a coil compression spring. With this arrangement the backlash between the pinion and the rack is minimized since the pinion can follow small variations in clearance due to rack and pinion inaccuracies. This pivoting servo-support has proved satisfactory in reducing misalignment between the drive pinion gear and the rack gear, but the cantilevered support has created a problem in adequately supporting the pinion gear and also in adequately supporting the entire drive unit for pivotal movement because the drive unit usually has considerable weight. Another disadvantage, and not an insignificant one, is that the pivotal servo-gearbox is quite expensive since it employs pre-loaded roller bearings to support the cantilevered weight.

A pivotally mounted drive unit similar to that described above is shown in the Brouwer U.S. Pat. No. 4,072,301. In this prior assembly, the drive unit has an overhanging bottom plate through which the output drive pinion projects and an overhanging portion of the plate extends under a specially designed slide frame plate and is pivotally supported on the plate by a pivot bolt with thrust bearings between the top and bottom plate of the drive unit and the special frame plate and another thrust bearing on top of the frame plate.

Another pivotal mount arrangement for a flame cutting machine gearbox assembly is shown in the Dobrauz U. S. Pat. No. 3,552,224. The Dobrauz gearbox assembly is a pivotal mounting consisting of widely spaced bearings and a fixed yoke member adapted to be connected to one of the slide frame parts. A pivot shaft is supported in these bearings and connected at both projecting ends of a yoke on the gearbox housing. While this arrangement has been satisfactory in many applications and provides adequate support for the gearbox housing assembly, it is costly and the yoke on the gearbox require that the gearbox output shaft be extended downwardly away from the gearbox a considerable distance to mate with the fixed rack because of part interference. This results in an undesirable cantilevering of the output pinion gear that reduces the accuracy of the drive.

Other examples of pivotally mounted gearboxes are found in the following patents: Rieser U.S. Pat. No. 2,838,229, Wall U.S. Pat. No. 3,469,068, Caldwell U.S. Pat. No. 3,739,652, Dreshman U.S. Pat. No. 3,866,484, and Kensrue U.S. Pat. No. 4,158,315.

It is a primary object of the present invention to ameliorate the problems noted above in drive unit assemblies for pattern or tape controlled machinery.

SUMMARY OF THE PRESENT INVENTION

In accordance with the present invention a servo-drive assembly is provided for machine slides driven by rack and pinion gearing that eliminates backlash between the rack and the pinion without the use of expensive ball bearing pivotal mounting arrangements. Toward this end the present servo-drive assembly includes a servo-motor support and gearbox with a pinion carrying output shaft all totally supported and cantilevered on a fixed base by a pair of spaced parallel normally flat springs that permit the servo-support to pivot somewhat in a plane perpendicular to the planes of the springs and prevent its movement in a direction parallel to these planes.

These springs bias the servo-support and pinion toward the rack gear and permit the servo-support to pivot to accommodate the inaccuracies in the rack and pinion gearing without any pivotal mounting bosses or roller bearings.

With this servo-support the mounting for the servo-motor no longer is a major contributor to the cost of the machine tool or the cost of the associated servo system.

According to one embodiment of the present invention the springs are defined by a single flat spring approximately 0.625 inches wide and 0.025 inches thick bent into a U-shaped configuration. The parallel legs of the spring flex to accommodate the pivotal movement of the servo-motor support and their ends are fastened to the sides of a rectangular block or base fixed to either the movable or stationary portion of the machine slide assembly. The servo-motor support includes a pair of flat plates that are fastened together and clamp on the opposite sides of the bight portion of the spring so the spring actually encloses the area between the plates along with a transversely positioned channel member spanning the straight legs of the spring. The space between the plates forms a second stage gearbox for a servo-motor output shaft gear and an enlarged reduction gear carried by the gearbox output shaft which projects from one of the support plates and it carries the pinion gear.

The servo-motor itself has a first stage gearbox mounted on the support plate opposite the projecting output shaft and they are laterally adjustable on the support plate to remove backlash between the servo-motor output gear and the enlarged reduction gear between the support plates.

When installed, the mounting block is positioned on the associated slide so that the spring legs are slightly flexed exerting a pre-load biasing force on the pinion against the rack gear.

According to a second embodiment of the present invention the servo-motor support springs are separate and fastened to the sides of a channel shaped plate defining the servo-motor-gearbox support.

Other objects and advantages of the present invention will become apparent upon reading the detailed description of the preferred embodiment.

BRIEF DESCRIPTION OF THE DRAWINGS

FIG. 5 is a a top view of one of the servo-drive assemblies illustrated in FIG. 2 shown as a sub-assembly in a relaxed position;

FIG. 6 is an exploded view of part of the servo-drive assembly illustrated in FIGS. 1–5;

FIG. 7 is a top view of a servo-drive assembly according to another embodiment of the present inention; and FIG. 8 is a partly exploded view of portions of the servo-drive assembly illustrated in FIG. 7.

DETAILED DESCRIPTION OF THE PREFERRED EMBODIMENTS

Figure 1:
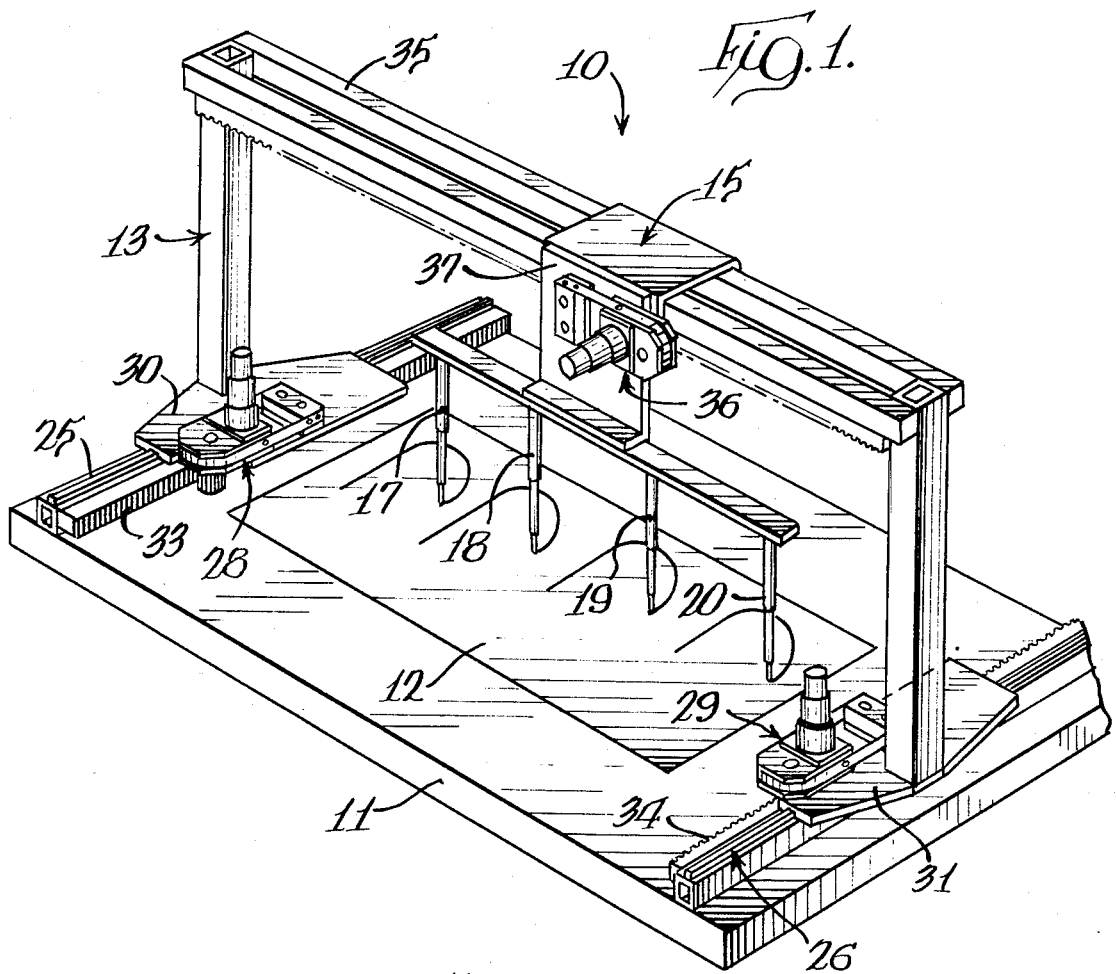
FIG. 1 is a schematic view of a flame cutting machine illustrating the present servo-drive assembly carried by its movable slides.

Referring to the drawings and particuilarly FIG. 1, a pattern or numerically controlled flame cutting machine 10 is illustrated consisting generally of a base 11 that supports a plate workpiece 12, a gantry 13 movable in one coordinate direction, and a cross-slide 15 mounted on the gantry for movement in a perpendicular coordinate direction. The cross-slide 15 carries flame cutting tools 17, 18, 19 and 20 that move simultaneously to cut four identical work pieces from work piece 12.

The gantry has spaced wheels (not shown) on each leg that ride on rails 25 and 26 fixed to the base 11. The gantry 13 is driven along the rails by drive assemblies 28 and 29 carried by frame plates 30 and 31 that form part of the conventional gantry structure. The drive assemblies 28 and 29 have output pinion gears (not shown in FIG. 1) that drivingly engage fixed rack gears 33 and 34 to drive the gantry along the rails 25 and 26.

The cross-slide 15 is driven along gantry ways 35 by a drive assembly 36 pivotally mounted on a front plate 37 of the cross-slide 15. The drive assembly 36 is identical to the drive assemblies 28 and 29 except for its mounting location. The drive assembly may be controlled by signals from a numerical control console that receives control data from a tape, or they may be controlled by signals generated by an optical pattern tracing system of conventional construction.

The drive assembly illustrated in FIG. 2 through 6 is the left gantry drive assembly 28 ilustrated in FIG. 1 but it should be understood that the three drive assemblies are substantially identical.

Referring to FIGS. 2 to 6 servo-drive assembly 28 is seen to generally include a mounting block 40 fixed to slide 30, a servo-motor support 41 defining a secondary gearbox carrying main output pinion 42 and supporting a combined servo-motor-generator and first stage gearbox 43 with the servo-motor support 41 being totally supported by and cantilevered from the mounting block 40 by a normally flat spring 45 bent during assembly into a U-shaped configuration.

Figure 2:
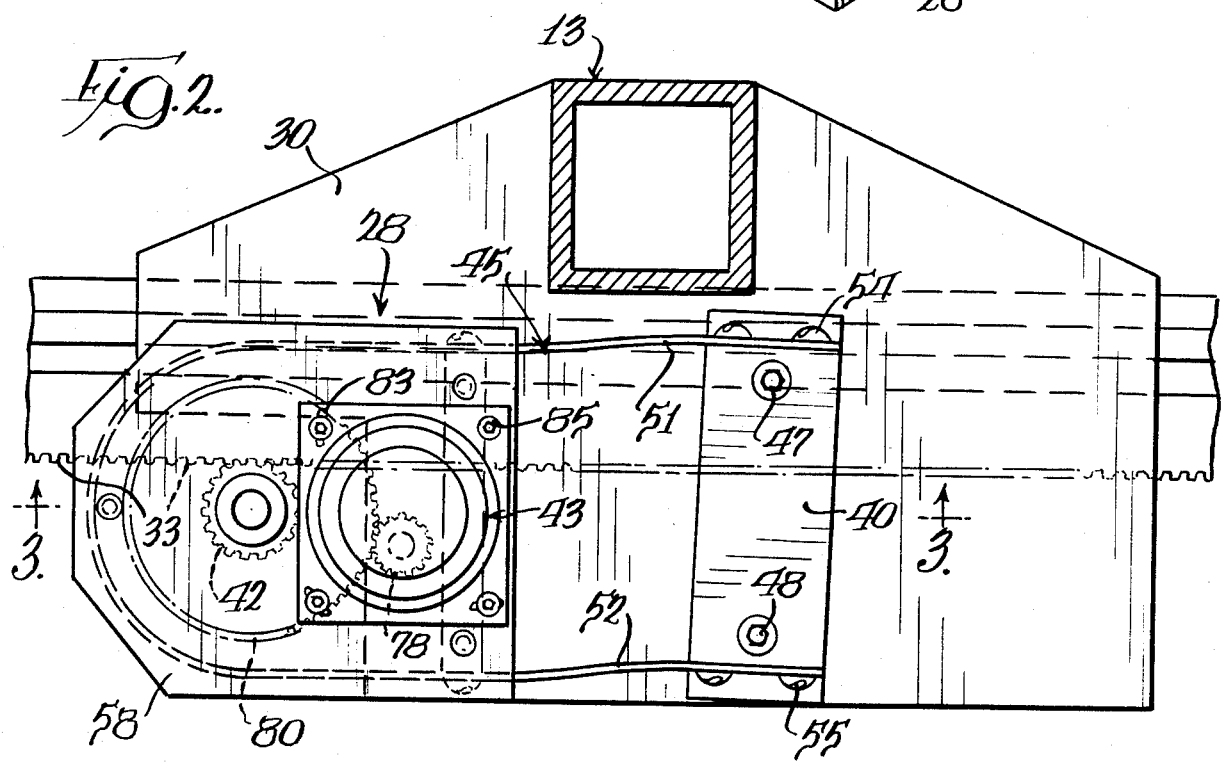
FIG. 2 is an enlarged top view of one of the servo-drive assemblies illustrated in FIG. 1 preloaded against one of the machine slide rack gears.

The mounting block 40 as seen in FIG. 2 is rectangular in configuration and is fixed to the slide 30 by a pair of fastening elements 47 and 48. The angular positioning of the mounting block 40 determines the preload flexing of the spring 45 as seen in FIG. 2 to achieve preloading of the pinion 42 against the rack gear 33.

The spring 45 is constructed of normally flat spring steel having an exemplary width of 0.625 inches and a thickness of 0.025 inches for the size of the servo-motor 43 illustrated but it should be understood that the width and thickness of the spring 45 is selected to accommodate the weight of the servo-motor support and servo-motor, as well as the desired amount of pivotal movement thereof and preload. The ends of spring legs 51 and 52 are rigidly connected to the mounting block 40 by fastener pairs 54 and 55.

The servo-motor support 41 includes a pair of spaced plates 58 and 59 mounted directly on the U-shaped bight portion 60 of spring 45 by fasteners 62, 63 and 64 seen more clearly in FIG. 6. The leg portions 51 and 52 of the spring 45 are maintained parallel to one another as well as free of any twisting by a channel shaped cross-member 66 seen in FIGS. 3 and 6. The spring leg portions 51 and 52 are connected to the cross-member 66 by fasteners 67 and 68. In this way the spring 45 and the cross-member 66 define an envelope between the plates 58 and 59 for the servo-support gearbox.

Figure 3:
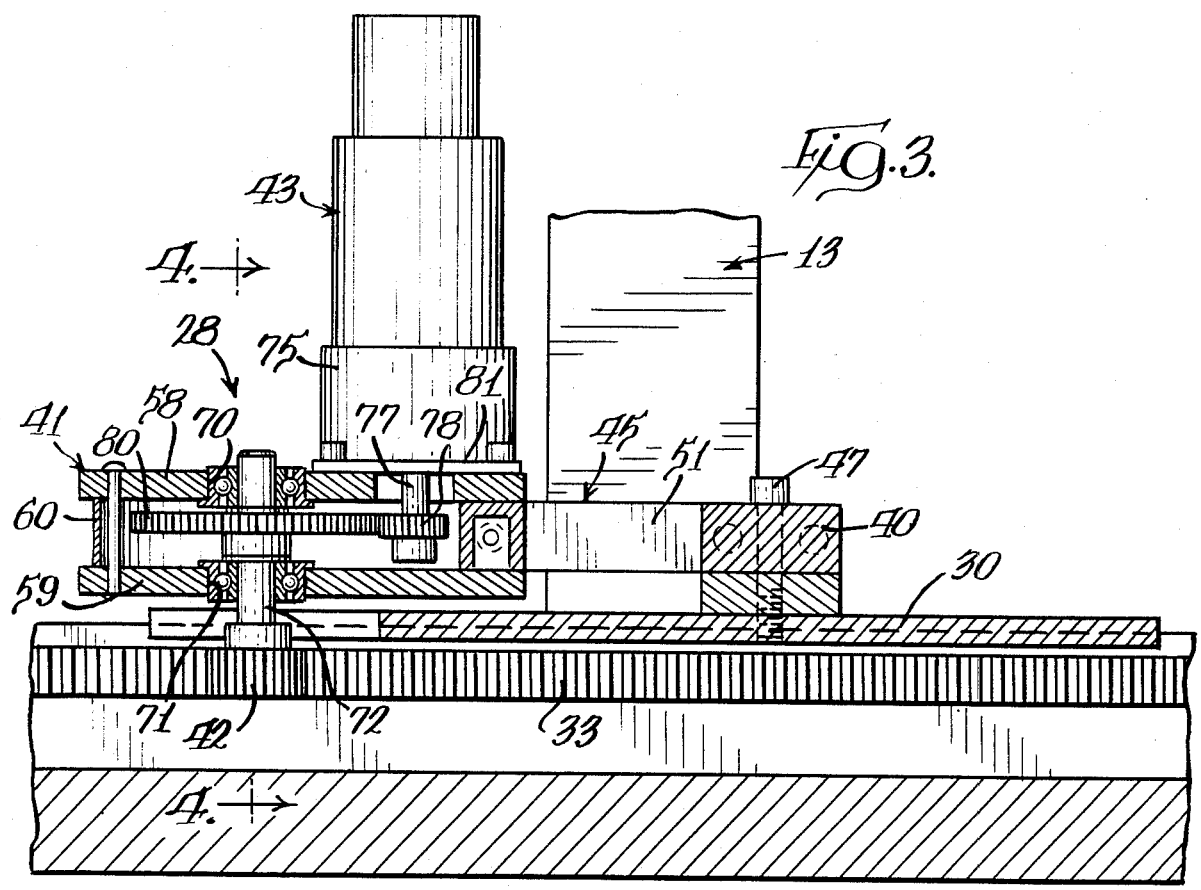
FIG. 3 is a longtitudinal section taken generally along line 3—3 of FIG. 2 illustrating the interior of the secondary gearbox.
Figure 4:
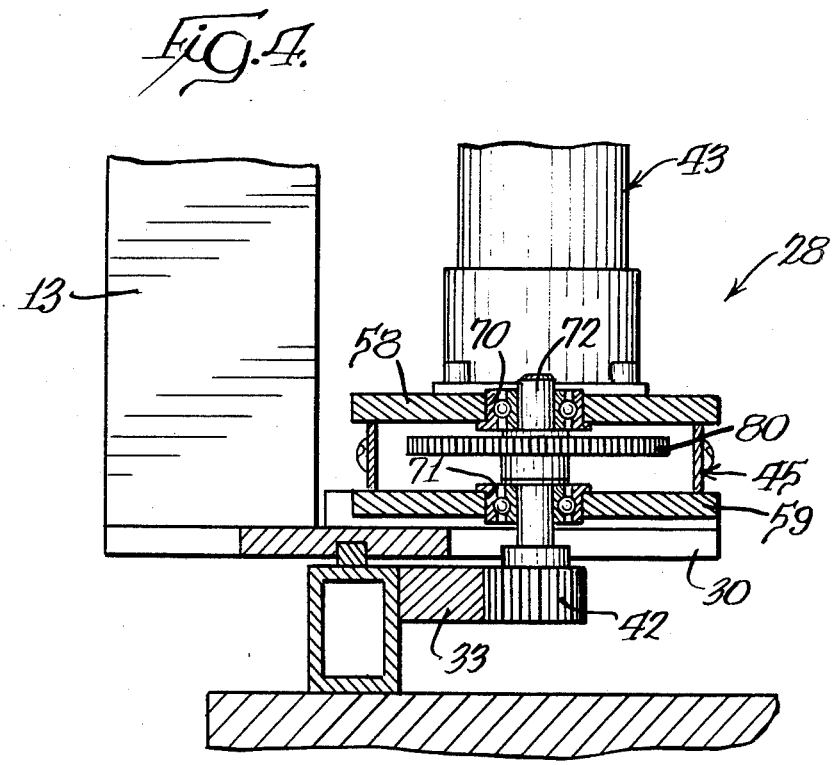
FIG. 4 is a cross-section taken generally along line 4—4 of FIG. 3.

The plates 58 and 59 have aligned apertures 70 and 71 as seen in FIG. 3 that receive ball bearings that support a gearbox output shaft 72 that has main pinion 42 keyed to its projecting end.

The motor-generator and gearbox combination 43 has a gearbox section 75 that contains reduction gearing that drives an offset output shaft 77 carrying an output gear 78 drivingly engaging an enlarged reduction gear 80 in the gearbox section between plates 58 and 59 keyed to the output shaft 72.

The gearbox section 75 has a flange 81 at its lower end mounted on top plate 58 that has four oversized mounting holes 83 as seen in FIGS. 2 and 5 that loosely receive fasteners 85 threadedly received in tapped holes in the top plate 58. This permits the servo-motor-generator 43 to be adjusted laterally somewhat on the top plate 58 before the fasteners 85 are fully tightened to remove backlash between the servo-motor output gear 78 and the enlarged reduction gear 80.

As noted above, the angular position of the mounting block 40 on the slide 30 determines the initial preload of the pinion gear 42 on the rack gear 33 by flexure of the spring legs 51 and 52. It should be understood that the spring 45 in the embodiment shown in FIGS. 2 to 6 only flexes between the cross-member 66 and the block 40 as seen in FIG. 2. The U-shaped portion of the spring 45 between the support plates 58 and 59 serves only to enclose the gearbox and properly space the support plates in a very simple fashion.

The pinion 42 may be manually disengaged from the rack for manual slide movement simply by pushing the servo-motor-generator 43 by a small distance away from the rack, thus flexing the spring legs 51 and 52. This is preferably done along with a mechanical arrangement that limits displacement, in order not to overload and thus permanently deform the springs 51 and 52. Because the spring legs 51 and 52 are relatively wide in a plane parallel to the axis of the pinion gear 42 they strongly resist any movement of the servo-motor support 41 in any direction other than perpendicular to the spring legs. By varying the thickness of the spring 45, the desired preload for a given deflection may be obtained. The cantilevered arrangement of the spring 45 allows motion almost perfectly perpendicular to the rack on one axis only.

A somewhat modified form of a servo-drive assembly according to the present invention is illustrated in FIGS. 7 and 8 and generally designated by the reference numeral 110. Servo-drive 110 is seen to include a U-shaped mounting block 111 adapted to be fixed to the machine slide in a similar manner to mounting block 40 in the FIGS. 2 through 6 embodiment. A pair of spaced parallel flat springs 114 and 115 are fixed to the sides of the mounting block 111 by fastener pairs 117 and 118 and project outwardly therefrom in cantilevered fashion. The distal ends of the springs 114 and 115 are fixed to the sides of a channel shaped servo-support member 120 by fastener pairs 122 and 123. The servo-support member 120 has an aperture 125 therein and four equally spaced apertures 127 for receiving fasteners 128.

In this embodiment the servo-support member 120 does not define a separate gearbox. a flange 130 on the bottom of motor-generator gearbox combination 131 is mounted directly on upper surface 132 of support member 120 by fasteners 128. A motor gearbox output shaft extends through aperture 125 in plate 128 and carries pinion 140. The servo-drive assembly 110 operates through flexure of the springs 114 and 115 to preload the pinion 140 against the interengaged rack gear and eliminates backlash in the same fashion as in the FIGS. 2 to 6 embodiment.

I claim:

1. A servo-drive for machine slides of the type driven by a rack gear carried by a first machine member and a pinion gear drivingly engaged with the rack gear carried by a second machine member movable relative to the first machine member, comprising: a base member fixed with respect to the second machine member, a servo-motor support transversely movable with respect to the rack having an output shaft rotatably mounted therein for carrying the pinion gear, a servo-motor carried by said servo-motor support and connected to rotate the output shaft and pinion, and means for biasing the pinion against the rack including a generally flat spring interconnecting the fixed base member and the servo-motor support, said generally flat spring supporting the servo-motor support for movement toward and away from the rack gear without any rotary bearings.

2. A servo-drive from machine slides of the type driven by a rack gear carried by a first machine member and a pinion gear drivingly engaged with the rack gear carried by a second machine member movable relative to the first machine member, as defined in claim 1, wherein the fixed base member is positioned on the second machine member to preload the generally flat spring and preload the pinion against the rack.

3. A servo-drive for machine slides of the type driven by a rack gear carried by a first machine member and a pinion gear drivingly engaged with the rack gear carried by a second machine member movable realtive to the first machine member, comprising: a base member fixed with respect to the second machine member, a servo-motor support transversely movable with respect to the rack having an output shaft rotatably mounted therein carrying the pinion gear, a servo-motor carried by said servo-motor support and connected to rotate the output shaft and pinion, and means for pivotally supporting the servo-motor support for movement toward and away from the rack including a generally flat spring interconnecting the fixed base member and the servo-motor support, said flat spring being constructed to movably support the servo-motor without any rotary bearings.

4. A servo-drive for machine slides of the type driven by a rack gear carried by a first machine member and a pinion gear drivingly engaged with the rack gear carried by a second machine member movable relative to the first machine member, comprising: a base member fixed with respect to the second machine member, a servo-motor support transversely movable with respect to the rack having an output shaft rotatably mounted therein carrying the pinion gear, a servo-motor carried by said servo-motor support and connected to rotate the output shaft and pinion, and means for pivotally supporting the servo-motor support for movement toward and away from the rack without any rotary bearings including at least two springs connected to the fixed base member and connected to and supporting the servo-motor support.

5. A servo-drive for machine slides of the type driven by a rack gear carried by a first machine member and a pinion gear drivingly engaged with the rack gear carried by a second machine member movable relative to the first machine member, as defined in claim 4, wherein the springs are substantially flat and lie in parallel planes parallel to the axis of the output shaft.

6. A servo-drive for machine slides of the type driven by a rack gear carried by a first machine member and a pinion gear drivingly engaged with the rack gear carried by a second machine member movable relative to the first machine member, comprising: a base member fixed with respect to the second machine member, a servo-motor support transversely movable with respect to the rack having an output shaft rotatably mounted therein carrying the pinion gear, a servo-motor carried by said servo-motor support and connected to rotate the output shaft and pinion, and means for pivotally supporting the servo-motor support for movement toward and away from the rack without any rotary bearings including at least one spring connected to the fixed base member and connected to and supporting the servo-motor support, the spring being a substantially flat spring lying in a plane parallel to the axis of the output shaft, the servo-motor support being formed in part by a pair of spaced plates, said spring being generally U-shaped in configuration with the bight of the "U" enclosing at least a portion of the space between the spaced servo-support plates.

7. A servo-drive for machine slides of the type driven by a rack gear carried by a first machine member and a pinion gear drivingly engaged with the rack gear carried by a second machine member movable relative to the first machine member, as defined in claim 4, wherein the servo-support member has a gearbox, including an enlarged gear in the gearbox directly fixed to the output shaft, said servo-motor having an output gear directly drivingly connected to the enlarged gearbox gear, and means adjustably mounting the servo-motor laterally on the servo-motor support to eliminate backlash between the servo-motor output gear and the enlarged gear in the gearbox.

8. A servo-drive for machine slides of the type driven by a rack gear connected to a first machine member and a pinion gear carried by a second machine member movable relative to the first machine member, comprising: a base fixed with respect to the second member having spaced parallel mounting surfaces, a motor support spaced from the base having an output shaft with a pinion adapted to drivingly engage the rack gear, motor means carried by the motor support and connected to drive the output shaft and pinion, and means for biasing the pinion toward the rack gear and supporting the motor support including a pair of normally flat springs, fixed to the base mounting surfaces and extending parallel with respect to one another to and fixed to opposite sides of the motor support, said springs being positioned in planes both parallel to the axis of the output shaft so that the motor support is prevented from moving in the direction of said planes and is permitted limited movement in a direction perpendicular to said planes whereby the pinion is spring biased toward the rack gear, said springs being constructed to support the motor support without rotary bearings.

9. A servo-drive for machine slides of the type driven by a rack gear carried by a first machine member and a pinion gear drivingly engaged with the rack gear carried by a second machine member movable relative to the first machine member, as defined in claim 8, wherein the base is positioned to slightly bend the normally flat springs when the pinion is fully engaged with the rack gear so that the gears are preloaded and backlash between the pinion and rack gear is minimized.

10. A servo-drive for machine slides of the type driven by a rack gear carried by a first machine member and a pinion gear drivingly engaged with the rack gear carried by a second machine member movable relative to the first machine member, as defined in claim 8, wherein the flat springs provide the sole support for the motor support and motor means.

11. a servo-drive for machine slides of the type driven by a rack gear carried by a first machine member and a pinion gear drivingly engaged with the rack gear carried by a second machine member movable relative to the first machine member, comprising; a base fixed with respect to the second member having spaced parallel mounting surfaces, a motor support spaced from the base having an output shaft with a pinion adapted to drivingly engage the rack gear, motor means carried by the motor support and connected to drive the output shaft and pinion, and means for biasing the pinion toward the rack gear and supporting the motor support including a pair of normally flat springs fixed to the base mounting surfaces and extending parallel with respect to one another and fixed to opposite sides of the motor support, said springs being positioned in planes both parallel to the axis of the output shaft so that the motor support is prevented from moving in the direction of said planes and is permitted limited movement in a direction perpendicular to said planes whereby the pinion is spring biased toward the rack gear, the base being positioned to slightly bend the normally flat springs when the pinion is fully engaged with the rack gear so that the gears are preloaded and backlash between the pinion and rack gear is minimized, said flat springs providing the sole support for the motor support and motor means, said flat springs being defined by a single normally flat spring bent into a U-shaped configuration and at least partly surrounding the motor support to define a portion of the enclosure for the motor support.

* * * * *